(12) United States Patent
Kim

(10) Patent No.: US 12,499,767 B2
(45) Date of Patent: Dec. 16, 2025

(54) APPARATUS FOR CONTROLLING PLATOONING VEHICLE AND METHOD THEREOF

(71) Applicants: Hyundai Motor Company, Seoul (KR); Kia Corporation, Seoul (KR)

(72) Inventor: Tae Wan Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 297 days.

(21) Appl. No.: 17/805,164

(22) Filed: Jun. 2, 2022

(65) Prior Publication Data

US 2023/0169864 A1    Jun. 1, 2023

(30) Foreign Application Priority Data

Dec. 1, 2021  (KR) .................... 10-2021-0170272

(51) Int. Cl.
| | | |
|---|---|---|
| G05D 1/00 | (2024.01) | |
| G08G 1/00 | (2006.01) | |
| G08G 1/16 | (2006.01) | |

(52) U.S. Cl.
CPC ............. G08G 1/166 (2013.01); G08G 1/162 (2013.01); G08G 1/22 (2013.01)

(58) Field of Classification Search
CPC ..................................... G08G 1/166
See application file for complete search history.

(56) References Cited

U.S. PATENT DOCUMENTS

| | | | |
|---|---|---|---|
| 10,388,168 B2 * | 8/2019 | Deragarden ........... | G08G 1/161 |
| 10,515,553 B2 | 12/2019 | Deragården et al. | |
| 2007/0023215 A1 * | 2/2007 | Ueda ....................... | B60L 58/40 |
| | | | 180/167 |
| 2016/0046178 A1 * | 2/2016 | Lim ....................... | H01M 10/48 |
| | | | 903/952 |
| 2016/0335892 A1 * | 11/2016 | Okada ..................... | G08G 1/164 |
| 2018/0126931 A1 | 5/2018 | Deragården et al. | |
| 2018/0137763 A1 | 5/2018 | Deragården et al. | |
| 2019/0171221 A1 * | 6/2019 | Minorics ................ | G08G 1/164 |
| 2019/0179339 A1 * | 6/2019 | Kim ........................ | G08G 1/162 |
| 2019/0180629 A1 * | 6/2019 | Kim .......................... | G08G 1/22 |
| 2019/0362632 A1 * | 11/2019 | Fokin ..................... | B60W 10/20 |
| 2020/0209889 A1 * | 7/2020 | Dev .......................... | B60R 1/27 |
| 2020/0286387 A1 * | 9/2020 | Zhou ...................... | G08G 1/0175 |
| 2020/0349850 A1 * | 11/2020 | Park ........................ | H04W 4/46 |
| 2021/0082286 A1 * | 3/2021 | Itou ........................ | B60Q 1/535 |
| 2021/0192958 A1 * | 6/2021 | Xu ..................... | B60W 60/0027 |
| 2021/0213869 A1 * | 7/2021 | Martin ................... | B60Q 1/085 |

FOREIGN PATENT DOCUMENTS

| | | |
|---|---|---|
| JP | 2002266672 A | 9/2002 |
| WO | 2016134770 A1 | 9/2016 |

* cited by examiner

*Primary Examiner* — Vivek D Koppikar
*Assistant Examiner* — Paul W Arellano
(74) *Attorney, Agent, or Firm* — SLATER MATSIL, LLP

(57) ABSTRACT

An embodiment platooning control apparatus includes a processor and a memory storing data and algorithms driven by the processor, wherein the algorithms, when executed by the processor, cause the processor to predict a collision with a host vehicle of a plurality of platooning vehicles caused by a vehicle entering a collision prediction area of the host vehicle during platooning, and to determine a control strategy based on a collision situation to share it with remaining vehicles of the platooning vehicles.

18 Claims, 19 Drawing Sheets

Situation 2

CASE X

| CASE | Collision party | Situation (collision party) | Rear situation (remaining platooning vehicles) |
|---|---|---|---|
| 1. Longitudinal acceleration avoidance | LV | Since no vehicle exists in front of LV, LV accelerates to avoid collision situation and temporarily leaves platooning group | < FV 1~N > Perform collision determination loop Frontmost vehicle of vehicles of CASE ≠1, 2, and 6 becomes LV of rear platooning group |
| 2. Lateral control avoidance | LV | Since vehicle exists in front of LV, LV avoids collision situation by changing lanes, and temporarily leaves platooning group | |
| 2-1. Lateral control avoidance | FV n | Collision is predicted to occur with FV, but vehicle exists in front of LV, so LV to FVn avoid collision situation by changing lane | < LV ~ FV n > Perform platooning separation from rear vehicle CASE 2-1, Request front platooning vehicle to change lane |
| 3. Longitudinal acceleration avoidance of platooning vehicle in front of collision party | FV n | Collision is predicted to occur with FV, and no vehicle exists in front of LV, so LV to FVn avoid collision situation by front acceleration | CASE 3, Request front platooning vehicle to accelerate CASE 4, Request LV to maintain a speed thereof and front FV to reduce inter-vehicle distance through acceleration |
| 4. Avoidance by reducing distance between platooning vehicles in front of collision party | FV n | Collision is predicted to occur with FV, but vehicle exists in front of LV, so LV maintains speed, and FV1 to n reduce inter-vehicle distance through acceleration | < FV n+1~N > Perform collision determination loop Frontmost vehicle of vehicles of CASE ≠1, 2, and 6 becomes LV of rear platooning group |
| 5. Longitudinal deceleration avoidance | LV | It avoids collision situation through deceleration Notify rear vehicle of deceleration and transfer longitudinal deceleration amount | < FV 1~N > Perform collision determination loop, Deceleration or lane change depending on result |
| | FV n | | < FV n+1~N > Perform collision determination loop, Deceleration or lane change depending on result |
| 6. Full braking control execution (collision avoidance impossible) | LV | Perform urgent full braking control in situation where collision avoidance is impossible Notify rear vehicle of full braking, and perform platooning separation and cut off high voltage and fuel | < FV 1~N > Perform longitudinal deceleration and collision determination loop. Frontmost vehicle of vehicles of CASE ≠1, 2, and 6 becomes LV of rear platooning group |
| | FV n | | < FV n+1~N > Perform collision determination loop, Deceleration or lane change depending on result |
| X. Normal driving situation | - | No problems with driving | Separate lateral/longitudinal control is not necessary |

FIG. 6

APPARATUS FOR CONTROLLING PLATOONING VEHICLE AND METHOD THEREOF

CROSS-REFERENCE TO RELATED APPLICATIONS

This application claims the benefit of Korean Patent Application No. 10-2021-0170272, filed on Dec. 1, 2021, which application is hereby incorporated herein by reference.

TECHNICAL FIELD

The present invention relates to a platooning control apparatus and a method thereof.

BACKGROUND

Platooning is a driving method in which a following vehicle follows a preceding vehicle, and platooning vehicles are allowed to drive while maintaining a certain inter-vehicle distance by transmitting and receiving various driving information through V2V communication and controlling a vehicle speed, a vehicle interval, etc.

When a leading vehicle collides with an obstacle in front during platooning, collision situation information is shared with following vehicles, and when the leading vehicle collides therewith, control authority of the leading vehicle is transferred to the following vehicle that does not collide therewith.

Conventionally, only the leading vehicle in a platooning group could predict a collision of the platooning vehicle, and following vehicles were able to determine whether there was a collision by receiving information from the leading vehicle. This illustrated is the diagram of FIG. 1.

However, since an eco-friendly vehicle is more sensitive to a collision than an engine vehicle, it is necessary to more actively predict a collision and determine a collision.

The above information disclosed in this background section is only for enhancement of understanding of the background of the invention, and therefore, it may contain information that does not form the prior art that is already known to a person of ordinary skill in the art.

SUMMARY

The present invention relates to a platooning control apparatus and a method thereof. Particular embodiments relate to a vehicle control technique when a collision situation occurs during platooning of an eco-friendly vehicle.

An exemplary embodiment of the present invention provides a platooning control apparatus and a method thereof, capable of improving stability of platooning by allowing each platooning vehicle to predict a collision during platooning and controlling it depending on a collision prediction situation.

The technical features of embodiments of the present invention are not limited to the features mentioned above, and other technical features not mentioned can be clearly understood by those skilled in the art from the description of the claims.

An exemplary embodiment of the present invention provides a platooning control apparatus including a processor configured to predict a collision caused by a vehicle entering a collision prediction area of a host vehicle during platooning, and to determine a control strategy depending on a collision situation to share it with platooning vehicles, and a storage configured to store data and algorithms driven by the processor.

In an exemplary embodiment, the processor may set an area from a midpoint of an inter-vehicle distance between the host vehicle and a front vehicle to a mid-point of an inter-vehicle distance between the host vehicle and a rear vehicle as a collision prediction area.

In an exemplary embodiment, the processor may predict a collision with a vehicle traveling abnormally when the vehicle traveling abnormally in the collision prediction area is detected.

In an exemplary embodiment, the processor may predict a possibility of a collision between a front vehicle or a rear vehicle of the host vehicle and another vehicle.

In an exemplary embodiment, the processor may predict a possibility of a collision between the host vehicle and another vehicle.

In an exemplary embodiment, the processor may determine whether collision avoidance is possible when another vehicle that interferes with driving of platooning vehicles exists in the collision prediction area.

In an exemplary embodiment, the processor may request full longitudinal braking to a rear vehicle of a collision target vehicle when the collision avoidance is impossible, and may continue driving of the collision target vehicle.

In an exemplary embodiment, the processor may notify following vehicles of the rear vehicle of full braking of the rear vehicle, and may request the rear vehicle to cut off a high voltage and fuel.

In an exemplary embodiment, the processor may determine whether avoidance through deceleration is possible when the collision avoidance is possible.

In an exemplary embodiment, the processor may request longitudinal deceleration to the rear vehicle of the collision target vehicle when the avoidance through deceleration is possible, and may continue driving of the collision target vehicle.

In an exemplary embodiment, the processor may determine a vehicle exists in front of a lane in which platooning vehicles are currently traveling when the avoidance through deceleration is impossible.

In an exemplary embodiment, the processor may request collision avoidance through front acceleration driving to a leading vehicle among the platooning vehicles when a front vehicle does not exist in front of the leading vehicle in the case where a collision of the leading vehicle is predicted.

In an exemplary embodiment, the processor may request collision avoidance through a lane change to a leading vehicle among the platooning vehicles when a front vehicle exists in front of the leading vehicle in the case where a collision of the leading vehicle is predicted.

In an exemplary embodiment, the processor, in the case where there is a platooning vehicle in front of a collision target vehicle, when a collision is predicted to occur at the rear of the collision target vehicle, may classify the collision target vehicle and platooning vehicles in front of the collision target vehicle as a front group.

In an exemplary embodiment, the processor may request vehicles of the front group to avoid a collision by changing a lane of the front group when there is another vehicle in front of the front group, or may request the vehicles of the front group to avoid a collision by allowing the front group to accelerate when there is no other vehicle in front of the front group.

In an exemplary embodiment, the processor may request vehicles of the front group to avoid a collision by reducing a distance between the leading vehicle and following vehicles except for the leading vehicle in the front group when there is another vehicle in front of the front group.

In an exemplary embodiment, the processor may classify following vehicles at the rear of the front group in a platooning group as a rear group, and may set a frontmost vehicle of the rear group as a new leading vehicle.

In an exemplary embodiment, the processor may perform longitudinal deceleration of the host vehicle, notify rear vehicles of the deceleration of the host vehicle, transmit a deceleration amount of the host vehicle to the rear vehicles, and report a driving situation to a leading vehicle when a collision of the host vehicle as a following vehicle in a platooning group is predicted.

In an exemplary embodiment, the processor may perform longitudinal deceleration of the host vehicle, notify rear vehicles of the deceleration of the host vehicle, and transmit a deceleration amount of the host vehicle to the rear vehicles when a collision of the host vehicle as a leading vehicle in a platooning group is predicted.

An exemplary embodiment of the present invention provides a platooning control method including predicting a collision caused by a vehicle entering a collision prediction area of a host vehicle during platooning, determining a control strategy depending on a collision situation, and sharing a collision prediction result thereof and a control strategy with platooning vehicles.

According to the present technique, it is possible to improve stability of platooning by allowing each platooning vehicle to predict a collision during platooning and controlling it depending on a collision prediction situation.

In addition, various effects that can be directly or indirectly identified through this document may be provided.

BRIEF DESCRIPTION OF THE DRAWINGS

FIG. 6 illustrates a table showing a situation for each collision prediction case according to an exemplary embodiment of the present invention.

DETAILED DESCRIPTION OF ILLUSTRATIVE EMBODIMENTS

Figure 1:
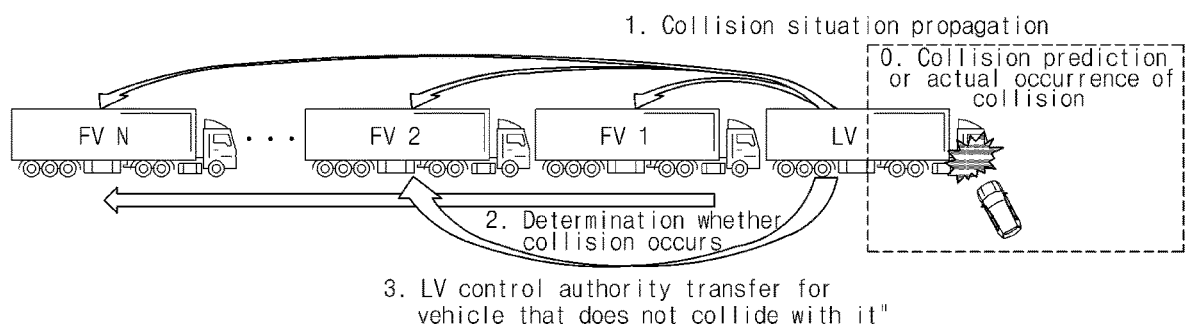
FIG. 1 illustrates a view for describing a situation in which a collision occurs during platooning according to the related art.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to an exemplary embodiment of the present invention, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present invention will be described in detail with reference to FIG. 2 to FIG. 10.

Figure 2:
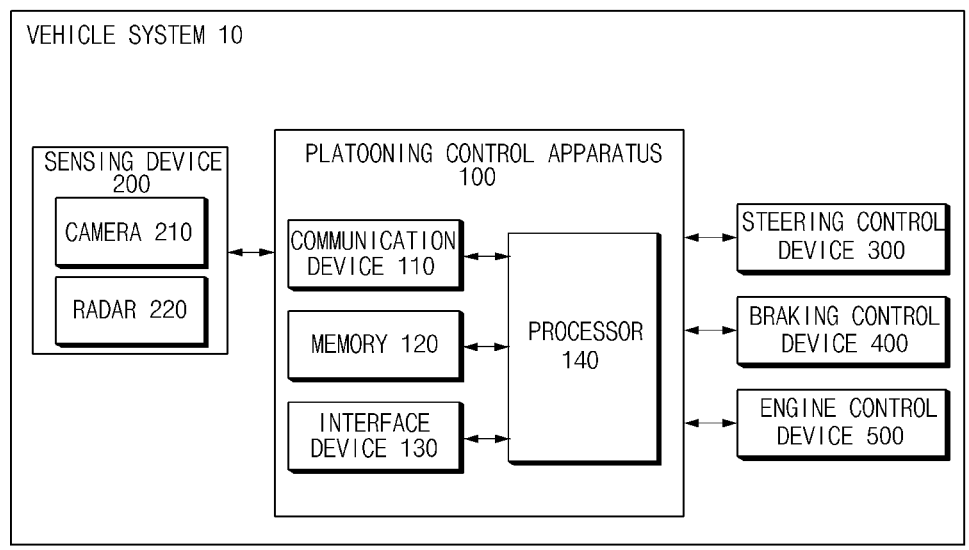
FIG. 2 illustrates a block diagram showing a configuration of a vehicle system including a platooning control apparatus according to an exemplary embodiment of the present invention.

FIG. 2 illustrates a block diagram showing a configuration of a vehicle system including a platooning control apparatus according to an exemplary embodiment of the present invention.

A leading vehicle LV and following vehicles FVs included in a platooning vehicle group may perform platooning on a road. The leading vehicle LV and the following vehicles FVs may be driven while maintaining a predetermined distance. While driving, the leading vehicle LV or the following vehicles FVs may adjust a distance between the leading vehicle LV and the following vehicles FVs based on sensor information and platooning information shared through V2V communication.

Referring to FIG. 2, the vehicle system according to an exemplary embodiment of the present invention may include a platooning control apparatus 100, a sensing device 200, a steering control device 300, a braking control device 400, and an engine control device 500.

The platooning control apparatus 100 according to the present exemplary embodiment of the present invention may be implemented inside the vehicle. In this case, the platooning control apparatus 100 may be integrally formed with internal control units of the vehicle, or may be implemented as a separate device to be connected to control units of the vehicle by a separate connection means.

The platooning control apparatus 100 may predict a collision caused by a vehicle entering a collision prediction area of a host vehicle during platooning, and may determine a control strategy depending on a collision situation to share it with platooning vehicles.

The platooning control apparatus 100 of the leading vehicle may be implemented as a potential leading vehicle (PLV), and the platooning control apparatus 100 of the following vehicle may be implemented as a potential following vehicle (PFV).

Referring to FIG. 2, the platooning control apparatus 100 may include a communication device 110, a memory (i.e., a storage or a memory storage) 120, an interface device 130, and a processor 140.

The communication device 110 is a hardware device implemented with various electronic circuits to transmit and receive signals through a wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like. As an example, the communication device 110 may transmit a valve control command signal to a pressure control valve.

In addition, the communication device 110 may perform communication by using a server, infrastructure, or third vehicles outside the vehicle, and the like through a wireless Internet access or short range communication technique. Herein, the wireless communication technique may include wireless LAN (WLAN), wireless broadband (Wibro), Wi-Fi, world interoperability for microwave access (WiMAX), etc. In addition, a short-range communication technique may include Bluetooth, ZigBee, ultra wideband (UWB), radio frequency identification (RFID), infrared data association (IrDA), and the like.

The communication device 110 may perform V2X communication. The V2X communication may include communication between a vehicle and all entities such as V2V (vehicle-to-vehicle) communication which refers to communication between vehicles, V2I (vehicle to infrastructure) communication which refers to communication between a vehicle and an eNB or road side unit (RSU), V2P (vehicle-to-pedestrian) communication, which refers to communication between user equipment (UE) held by vehicles and individuals (pedestrians, cyclists, vehicle drivers, or passengers), and V2N (vehicle-to-network) communication.

The memory 120 may store sensing results of the sensing device 200 and data and/or algorithms required for the processor 140 to operate, and the like. As an example, the memory 120 may store a control strategy when predicting a collision situation during platooning.

The memory 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, or an optical disk.

The interface device 130 may include an input means for receiving a control command from a user and an output means for outputting an operation state of the control apparatus 100 and results thereof.

Herein, the input means may include a key button, and may include a mouse, a joystick, a jog shuttle, a stylus pen, and the like. In addition, the input means may include a soft key implemented on the display.

The output means may include a display, and may also include a voice output means such as a speaker. In this case, when a touch sensor formed of a touch film, a touch sheet, or a touch pad is provided on the display, the display may operate as a touch screen, and may be implemented in a form in which an input device and an output device are integrated. In this case, the display may include at least one of a liquid crystal display (LCD), a thin film transistor liquid crystal display (TFT LCD), an organic light emitting diode display (OLED display), a flexible display, a field emission display (FED), or a 3D display.

For example, the interface device 130 may display a platooning situation. In this case, the platooning situation may include platooning joining or releasing, a collision prediction situation, group separation depending on the control strategy, and the like.

The processor 140 may be electrically connected to the communication device 110, the memory 120, the interface device 130, and the like, may electrically control each component, and may be an electrical circuit that executes software commands, thereby performing various data processing and calculations described below.

The processor 140 may process a signal transferred between components of the platooning control apparatus 100, and may perform overall control such that each of the components can perform its function normally.

The processor 140 may be implemented in the form of hardware, software, or a combination of hardware and software, or may be implemented as a microprocessor, and may be, e.g., an electronic control unit (ECU), a micro controller unit (MCU), or other sub-controllers mounted in the vehicle.

The processor 140 may predict a collision caused by a vehicle entering a collision prediction area of a host vehicle during platooning, and may determine a control strategy depending on a collision situation to share it with platooning vehicles.

The processor 140 may set an area from a midpoint of an inter-vehicle distance between the host vehicle and a front vehicle to a mid-point of the inter-vehicle distance between the host vehicle and a rear vehicle as a collision prediction area.

When a vehicle traveling abnormally in the collision prediction area is detected, the processor 140 may predict a collision with the vehicle traveling abnormally.

That is, the processor 140 may predict a possibility of collision between the front vehicle or the rear vehicle of the host vehicle and another vehicle, and may predict a collision possibility between the host vehicle and the other vehicle to share it with the vehicles.

The processor 140 may determine whether collision avoidance is possible when another vehicle that interferes with the driving of the platooning vehicle exists in the collision prediction area.

Accordingly, when the collision avoidance is impossible, the processor 140 may request full longitudinal braking to a rear vehicle of the target vehicle to collide, and may continue driving of the collision target vehicle.

The processor 140 may notify following vehicles of the rear vehicle of full braking of the rear vehicle, and may request the rear vehicle to cut off a high voltage and fuel.

When the collision avoidance is possible, the processor 140 may determine whether avoidance through deceleration is possible.

When the avoidance through deceleration is possible, the processor 140 may request longitudinal deceleration to a rear vehicle of the collision target vehicle, and may continue driving of the collision target vehicle.

When the avoidance through deceleration is impossible, the processor 140 may determine whether a vehicle exists in front of a lane in which the platooning vehicle is currently traveling.

In the case where a collision of the leading vehicle among the platooning vehicles is predicted, the processor 140 may request collision avoidance through front acceleration driving to the leading vehicle when the front vehicle does not exist in front of the leading vehicle.

In the case where the collision of the leading vehicle among the platooning vehicles is predicted, the processor 140 may request collision avoidance through lane change to the leading vehicle when the front vehicle exists in front of the leading vehicle.

In the case where a platooning vehicle exists in front of the collision target vehicle, when a collision is predicted to occur at the rear of the collision target vehicle, the processor 140 may classify the collision target vehicle and the platooning vehicles in front of the collision target vehicle as a front group.

When there are other vehicles in front of the front group, the processor 140 may request the vehicles of the front group to avoid collision by changing the lane of the front group, and when there is no other vehicle in front of the front group, the processor 140 may request the vehicles of the front group to avoid a collision by allowing the front group to accelerate.

When there is another vehicle in front of the front group, the processor 140 may request the vehicles of the front group to avoid a collision by reducing a distance between the leading vehicle and the following vehicles except for the leading vehicle in the front group.

The processor 140 may classify the following vehicles at the rear of the front group in the platooning group as a rear group, and may set a frontmost vehicle of the rear group as a new leading vehicle.

When a collision of the host vehicle as the following vehicle in the platooning group is predicted, the processor 140 may perform longitudinal deceleration of the host vehicle, notify the rear vehicles of the deceleration of the host vehicle, transmit a deceleration amount of the host vehicle to the rear vehicles, and report a driving situation to the leading vehicle. When the collision of the host vehicle as the leading vehicle in the platooning group is predicted, the processor 140 may perform longitudinal deceleration of the host vehicle, notify the rear vehicles of the deceleration of the host vehicle, and transmit a deceleration amount of the host vehicle to the rear vehicles.

The sensing device 200 may include one or more sensors that sense an obstacle, e.g., an abnormal vehicle entering the collision prediction area, and measure a distance with the obstacle and/or a relative speed thereof.

The sensing device 200 may include a plurality of sensors to sense an external object of the vehicle, to obtain information related to a position of the external object, a speed of the external object, a moving direction of the external object, and/or a type of the external object (e.g., vehicles, pedestrians, bicycles or motorcycles, etc.). To this end, the sensing device 200 may include a camera 210 and a radar 220, and may further include an ultrasonic sensor, a laser scanner and/or a corner radar, a lidar, an acceleration sensor, a yaw rate sensor, a torque measurement sensor and/or a wheel speed sensor, a steering angle sensor, and the like.

The steering control device 300 may be configured to control a steering angle of a vehicle, and may include a steering wheel, an actuator interlocked with the steering wheel, and a controller controlling the actuator.

The braking control device 640 may be configured to control braking of the vehicle, and may include a controller that controls a brake thereof.

The engine control device 500 may be configured to control engine driving of a vehicle, and may include a controller that controls a speed of the vehicle.

As such, safety of the platooning may be improved by individually setting and following an inter-vehicle distance of each vehicle in consideration of vehicle performance (braking control specification, communication specification, etc.), driving tendency, etc. of each vehicle joining a same platooning group during the platooning.

Figure 3:
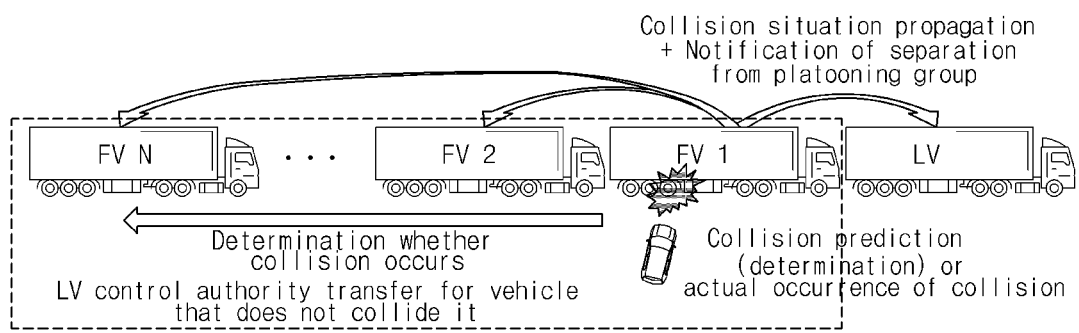
FIG. 3 illustrates a view for describing a collision situation strategy of a platooning control apparatus according to an exemplary embodiment of the present invention.

FIG. 3 illustrates a view for describing a collision situation strategy of a platooning control apparatus according to an exemplary embodiment of the present invention.

Referring to FIG. 3, each platooning vehicle detects a case in which an abnormal vehicle enters into a collision prediction area of the host vehicle and determines a collision possibility. For example, when a collision is predicted with a following vehicle FV1 traveling behind the leading vehicle LV, the following vehicle FV1 shares a collision prediction result of the host vehicle with the platooning vehicles, and notifies platooning separation of the host vehicle and the leading vehicle LV. Remaining following vehicles FV2 to FVN determine whether collision of the host vehicle occurs, and a frontmost vehicle among vehicles that do not collide therewith is selected as the leading vehicle to form new platooning.

Figure 4A:
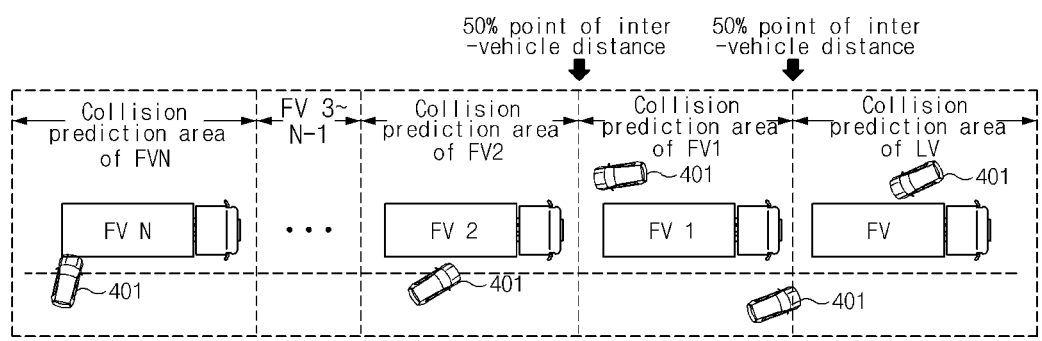
FIG. 4A to FIG. 4C illustrate views for describing a collision prediction area according to an exemplary embodiment of the present invention.
Figure 4B:
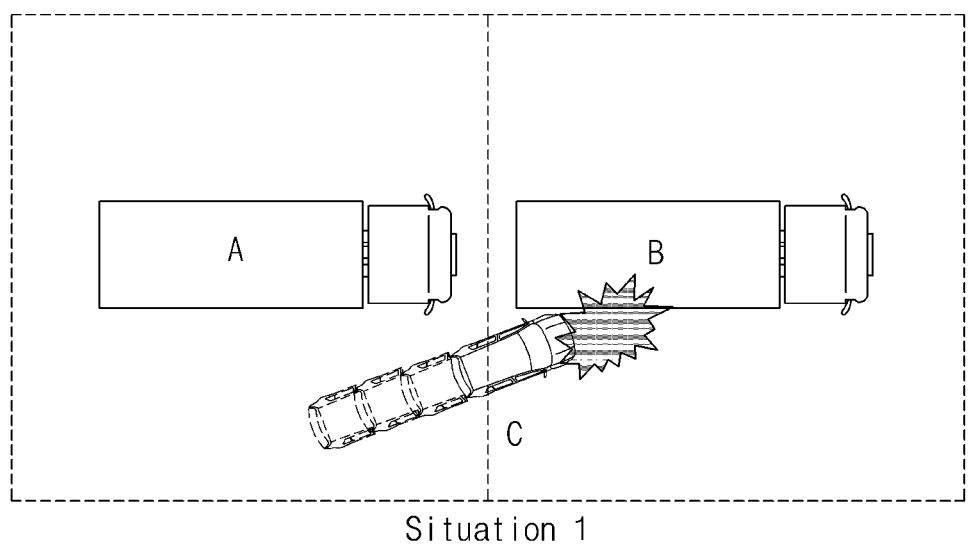
Figure 4C:
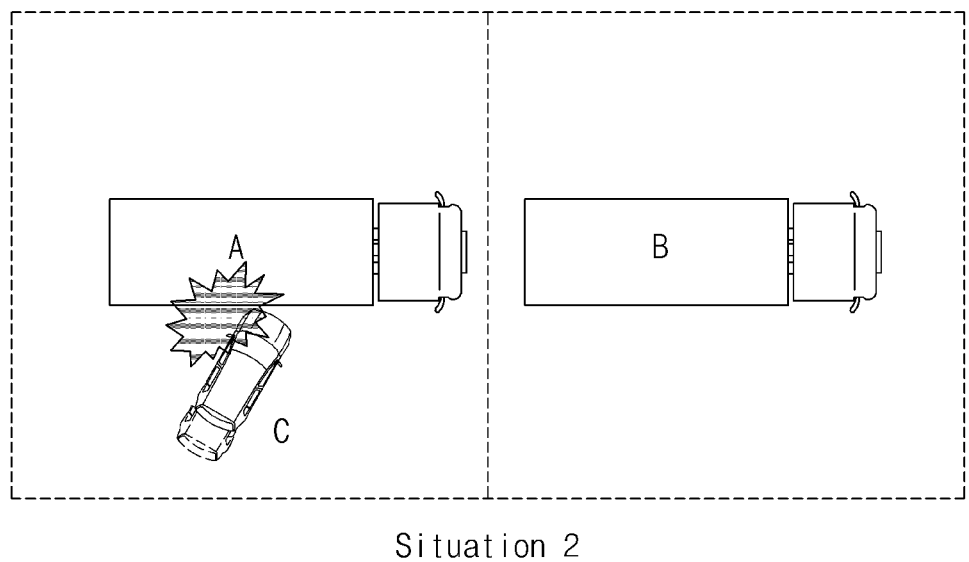

FIG. 4A to FIG. 4C illustrate views for describing a collision prediction area according to an exemplary embodiment of the present invention.

Referring to FIG. 4A, an area between midpoints of distances between platooning vehicles may be set as a collision prediction area. For example, an area from a midpoint (50% point) of an inter-vehicle distance between the following vehicle FV1 and the leading vehicle LV to a midpoint of an inter-vehicle distance of the following vehicle FV1 and the following vehicle FV2 may be set in a longitudinal direction of the collision prediction area of the following vehicle FV1. A lateral direction of the collision prediction area may be set within a predetermined distance left and right from the host vehicle. The predetermined distance may be calculated and set by an experimental value in advance. That is, sizes of the lateral distance and the longitudinal distance of the collision prediction area may be determined and changed by experimental values in advance.

As such, the collision prediction area may be set for each platooning vehicle, and each vehicle may predict whether a collision will occur by determining whether an abnormal vehicle 401 enters the collision prediction area of the host vehicle and determining a speed, etc. of the abnormal vehicle 401, and may share a predicted result thereof with the platooning vehicles.

The platooning control apparatus 100 of each platooning vehicle predicts and determines a collision when the vehicle traveling abnormally enters within the collision prediction area, and may distinguish a collision prediction vehicle, a collision target vehicle, and a collision-inducing vehicle. In this case, the platooning control apparatus 100 may determine whether abnormal driving occurs based on relative angle, position, and speed factors with respect to a driving vehicle.

The platooning control apparatus 100 may predict that an abnormal vehicle entering the collision prediction area will collide with a front vehicle or a rear vehicle driving in the platooning as illustrated in FIG. 4B. In this case, A indicates a collision prediction vehicle, B indicates a collision target vehicle, and when C indicates a collision-inducing vehicle, the collision target vehicle and the collision prediction vehicle are different vehicles.

In addition, the platooning control apparatus 100 may predict that the abnormal vehicle entering the collision prediction area will collide with the host vehicle in the platooning as illustrated in FIG. 4C. In this case, when A indicates a collision prediction vehicle, B indicates a collision target vehicle, and when C indicates a collision-inducing vehicle, the collision prediction vehicle and the collision target vehicle are the same as the host vehicle.

As such, according to embodiments of the present invention, deviating from a method that an existing leading vehicle predicts a collision of a platooning vehicle, the following vehicles may also predict a collision of the host vehicle, share it with the platooning vehicles, and allow the host vehicle, which is the collision target vehicle, to actively perform collision avoidance control without relying on the leading vehicle.

FIG. 5A to FIG. 5H each illustrate examples of collision prediction and vehicle control according to an exemplary embodiment of the present invention, and FIG. 6 illustrates a table showing a situation for each collision prediction case according to an exemplary embodiment of the present invention.

Figure 5A:
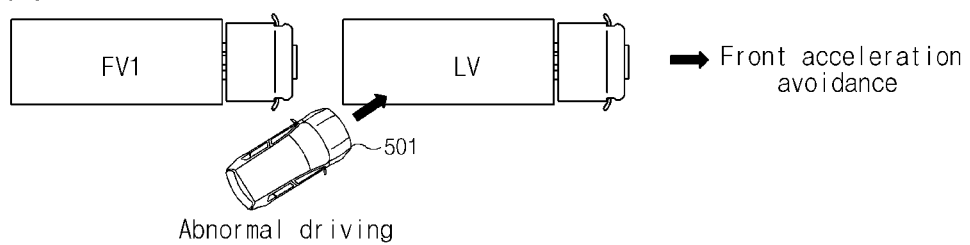
FIG. 5A to FIG. 5H each illustrate examples of collision prediction and vehicle control according to an exemplary embodiment of the present invention.

FIG. 5A illustrates an example in which a following vehicle FV1 predicts a collision between the leading vehicle LV and an abnormal vehicle 501 and performs collision avoidance control as Case 1. Referring to FIG. 6, in Case 1, the leading vehicle LV may be accelerated to be temporarily separated from a platooning group in order to avoid a collision.

Figure 5B:
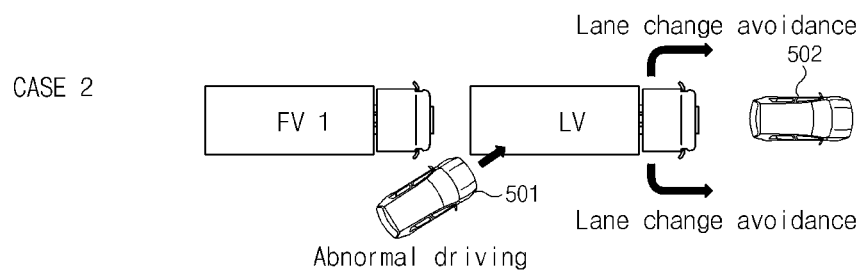

FIG. 5B illustrates an example in which the following vehicle FV1 predicts a collision between the leading vehicle LV and the abnormal vehicle 501 and performs collision avoidance control as Case 2. Referring to FIG. 6, in Case 2, when a front vehicle 502 exists in front of the leading vehicle LV, the leading vehicle LV may change a lane thereof to be temporarily separated from the platooning group in order to avoid a collision.

In this case, as in Case 1 and Case 2, the leading vehicle LV may be temporarily separated from the platooning group to avoid a collision, remaining following vehicles FV1 to N may perform a collision determination loop, and a frontmost vehicle of the vehicles other than Cases 1, 2, and 6 among the remaining following vehicles FV1 to N may be set as the leading vehicle in the rear group. In this case, the collision determination loop may include a process of determining a control strategy by detecting whether an abnormal vehicle exists in the collision prediction area for each vehicle.

Figure 5C:
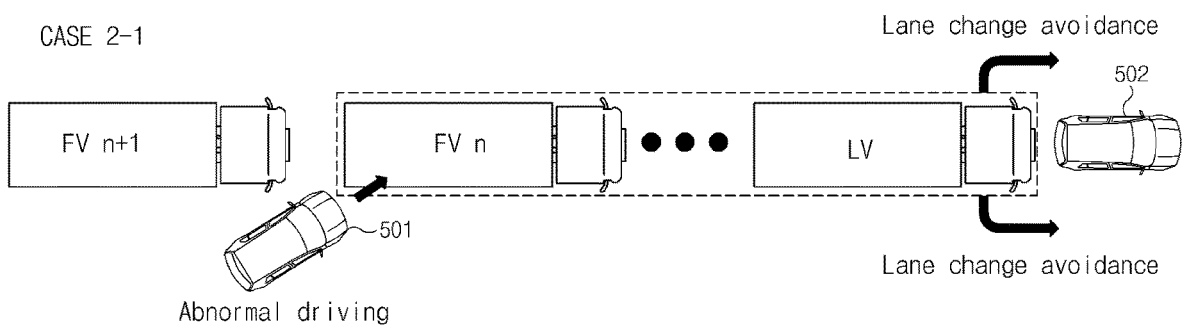

FIG. 5C illustrates an example in which the following vehicle FV(n+1) predicts a collision between the following vehicle FVn and the abnormal vehicle 501 and performs collision avoidance control as Case 2-1. In this case, the control strategy in a case where the front vehicle 502 exists in front of the leading vehicle LV is illustrated. The platooning vehicles from the following vehicle FVn to the leading vehicle LV may be classified as a front platooning group, and a collision may be avoided by changing a lane of the front platooning group.

Figure 5D:
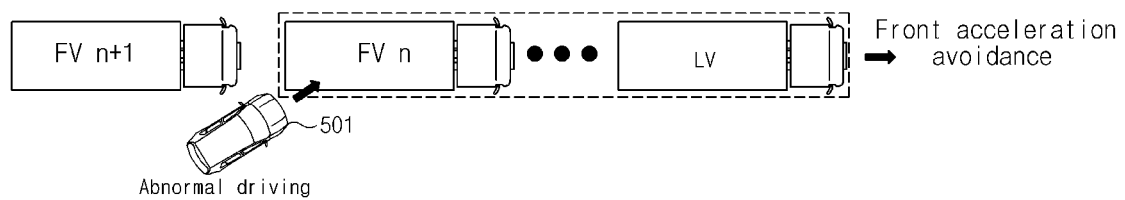

FIG. 5D illustrates an example in which the following vehicle FV(n+1) predicts a collision between the following vehicle FVn and the abnormal vehicle 501 and performs collision avoidance control as Case 3. In this case, the control strategy in a case where no front vehicle exists in front of the leading vehicle LV is illustrated. The platooning vehicles from the following vehicle FVn to the leading vehicle LV may be classified as a front platooning group, and a collision with the abnormal vehicle 501 may be avoided by accelerating the front platooning group. Referring to FIG. 6, as in Cases 2-1 and 3, a collision may be predicted with the following vehicle FVn, but the collision may be avoided by accelerating or changing the lane of the front platooning group.

Figure 5E:
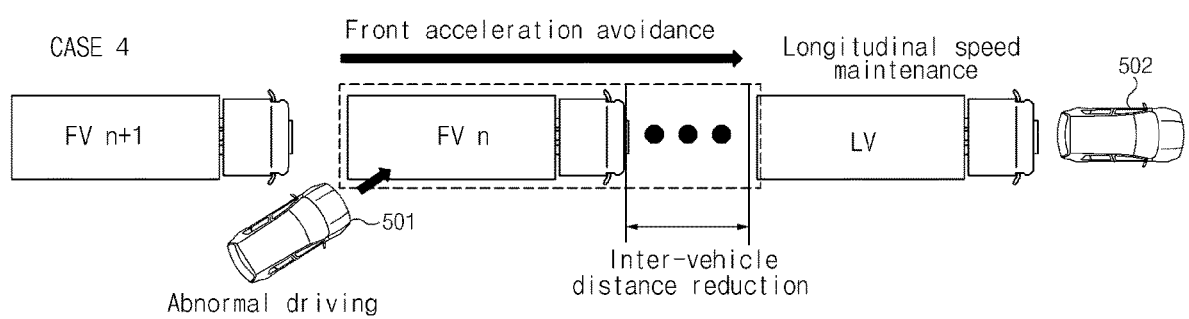

FIG. 5E illustrates an example in which the following vehicle FV(n+1) predicts a collision between the following vehicle FVn and the abnormal vehicle 501 and performs collision avoidance control as Case 4. In this case, the control strategy in a case where the front vehicle 502 exists in front of the leading vehicle LV is illustrated. It is possible to reduce an inter-vehicle distance between the leading vehicle LV and the front platooning group by separating the following vehicle FV(n+1) from the following vehicle FVn, classifying the platooning vehicles up to the leading vehicle LV as the front platooning group, maintaining a longitudinal speed of the leading vehicle LV, and accelerating the front platooning group. Referring to FIG. 6, in Case 4, the following vehicles FV(n+1) to N performs a collision determination loop, and a frontmost vehicle of the vehicles other than Cases 1, 2, and 6 among the following vehicles FV(n+1) to N may be set as the leading vehicle of the rear platooning group.

Figure 5F:
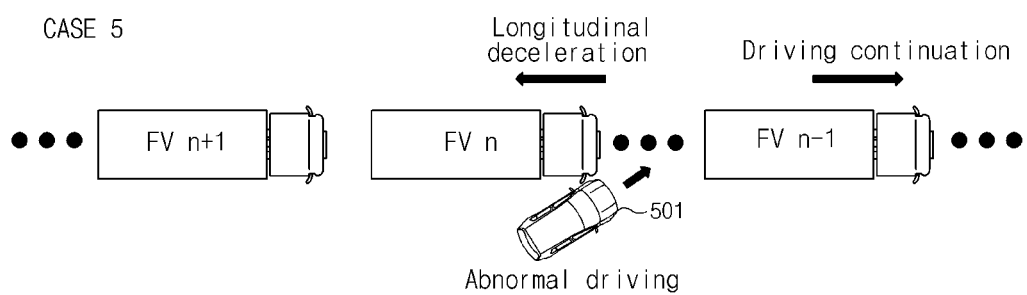

FIG. 5F illustrates an example in which the following vehicle FVn predicts a collision between the host vehicle and the abnormal vehicle 501 and avoids a collision as Case 5. The following vehicle FVn may avoid the collision by controlling the longitudinal deceleration and continuing driving of the vehicle FV(n−1) in front of the following vehicle FVn.

Figure 5G:
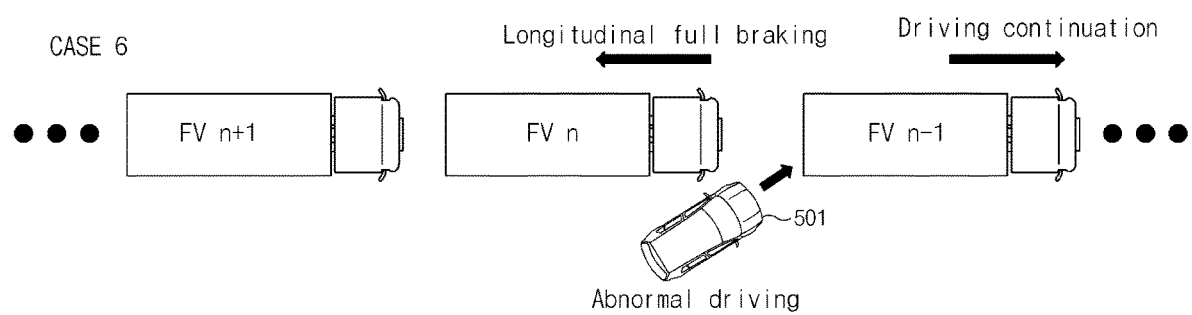

FIG. 5G illustrates an example in which the following vehicle FVn predicts a collision between the host vehicle and the abnormal vehicle 501 and avoids a collision as Case 6. In this case, the following vehicle FVn performs full longitudinal braking, and the vehicle FV(n−1) in front of the following vehicle FVn continues to travel. In this case, referring to FIG. 6, when a collision target vehicle is the leading vehicle LV, the following vehicles FV1 to N performs longitudinal deceleration and a collision determination loop, and a frontmost vehicle of the vehicles other than Cases 1, 2, and 6 may be set as the leading vehicle of the following platooning group.

Figure 5H:
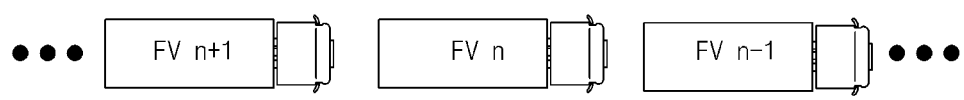

FIG. 5H illustrates Case X. Case X is a normal situation in which a collision is not predicted, so it is a state in which there is no need to control deceleration or acceleration.

Figure 7:
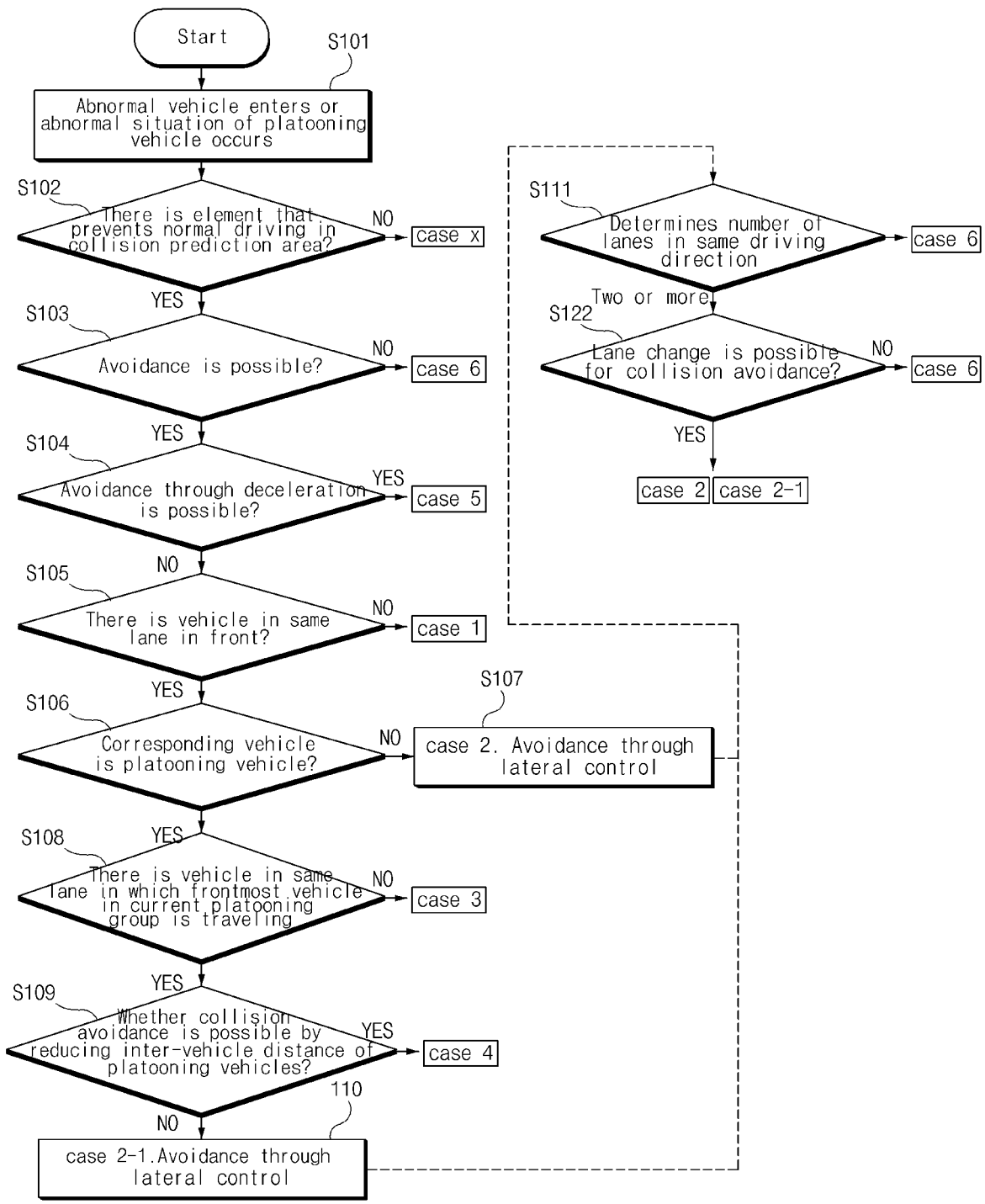
FIG. 7 illustrates a flowchart showing a method of determining a control strategy when predicting a collision during platooning according to an exemplary embodiment of the present invention.
Figure 8:
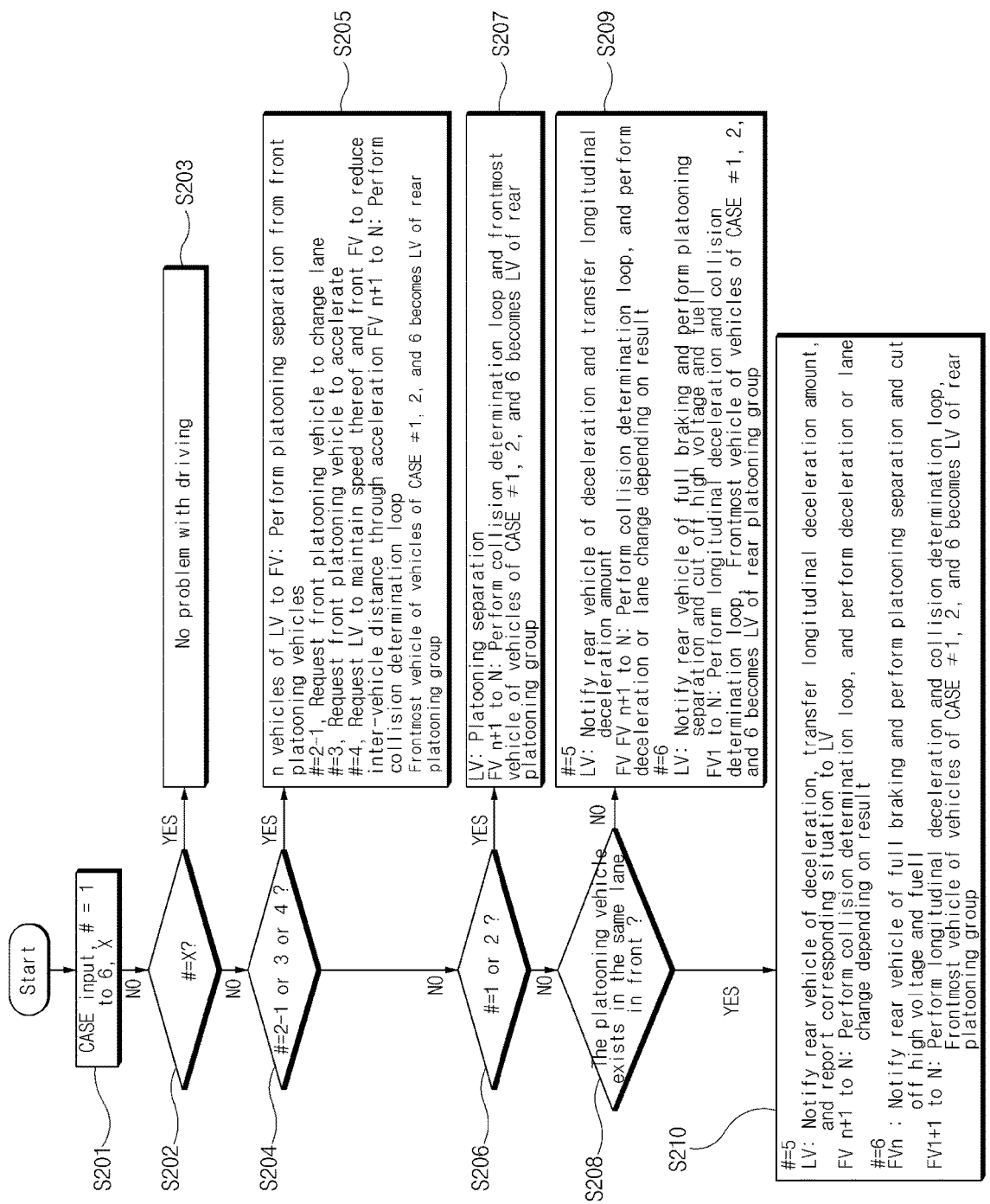
FIG. 8 illustrates a flowchart showing a platooning control method depending on a control strategy according to an exemplary embodiment of the present invention.
Figure 9:
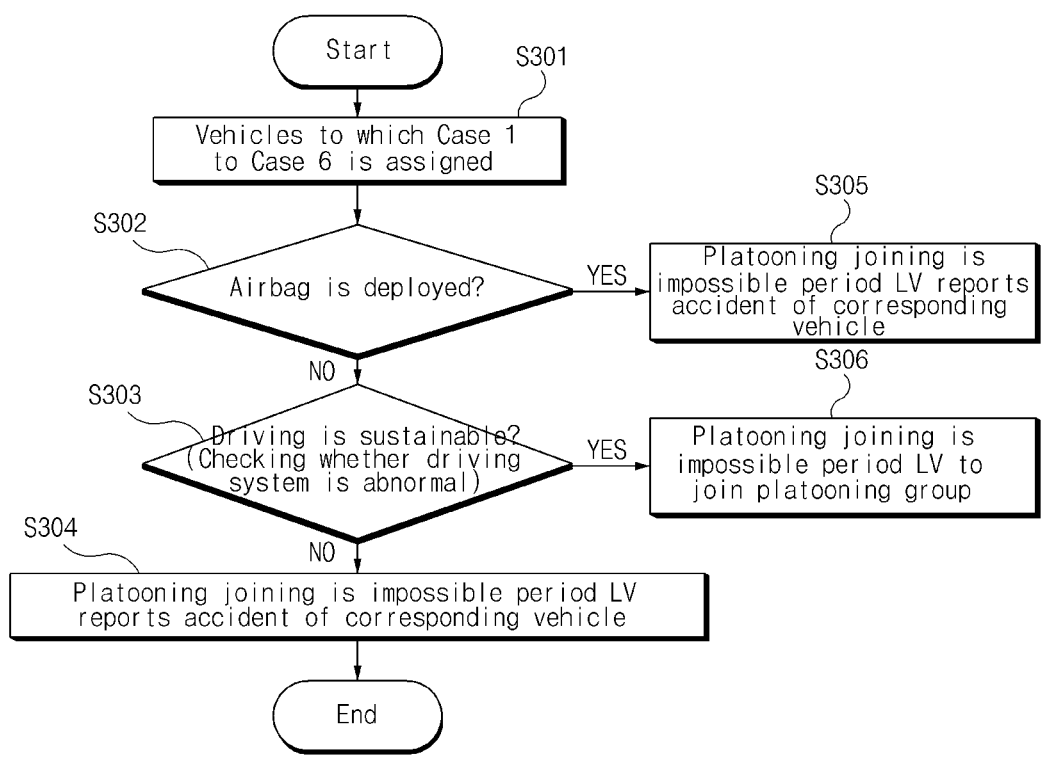
FIG. 9 illustrates a flowchart showing a platooning control method of a platooning vehicle assigned with Cases 1 to 6 according to an exemplary embodiment of the present invention.

Hereinafter, a vehicle control method for predicting and avoiding a collision during platooning according to an exemplary embodiment of the present invention will be described in detail with reference to FIG. 7 to FIG. 9. FIG. 7 illustrates a flowchart showing a method of determining a control strategy when predicting a collision during platooning according to an exemplary embodiment of the present invention, and FIG. 8 illustrates a flowchart showing a platooning control method depending on a control strategy determined in FIG. 7 according to an exemplary embodiment of the present invention. FIG. 9 illustrates a flowchart showing a platooning control method of a platooning vehicle to which Cases 1 to 6 are assigned in FIG. 8.

Hereinafter, each of the platooning vehicles including a leading vehicle and at least one or more following vehicles includes the platooning control apparatus 100, and it is assumed that the platooning control apparatus 100 of each vehicle performs the processes of FIG. 7 to FIG. 9. In addition, in the description of FIG. 7 to FIG. 9, operations described as being performed by the device may be understood as being controlled by the processor 140 of the platooning control apparatus 100 for the vehicle.

Referring to FIG. 7, the platooning control apparatus 100 of each platooning vehicle determines whether an abnormal vehicle enters the collision prediction area or an abnormal situation of the platooning vehicle has occurred (S101). In this case, as illustrated in FIG. 4A, each of the platooning vehicles LV to FVn sets the collision prediction area within a predetermined distance from a host vehicle, and determines whether the abnormal vehicle exists within the collision prediction area of each vehicle. Accordingly, each of the platooning vehicles LV to FVn may determine a case in which the abnormal vehicle enters the collision prediction area of the host vehicle or an abnormal situation occurs, and may share it with the platooning vehicles including the leading vehicle.

Accordingly, when it is determined that the abnormal vehicle enters the collision prediction area of the host vehicle or the abnormal situation of the platooning vehicle occurs, the platooning control apparatus 100 of each platooning vehicle determines whether there is an element that prevents normal driving in the collision prediction area (S102), and determines a control strategy as Case x when it is determined that there is no element that prevents normal driving within the collision prediction area.

Meanwhile, when there is an element that prevents the normal driving within the collision prediction area, the platooning control apparatus 100 determines whether it is possible to avoid a factor that prevents the normal driving (S103). In this case, the platooning control apparatus 100 is a platooning control apparatus for a vehicle that determines that there is the element that prevents the normal driving.

The platooning control apparatus 100 determines the control strategy as Case 6 when it cannot avoid a factor that interferes with the normal driving, while it determines whether avoidance through deceleration is possible when it can avoid the factor that interferes with the normal driving (S104).

The platooning control apparatus 100 determines the control strategy as Case 5 when the avoidance through the deceleration is possible, and determines whether there is a vehicle in a same lane in front when the avoidance through the deceleration is not possible (S105).

The platooning control apparatus 100 determines the control strategy as Case 1 when there is no vehicle in the same lane in front, and determines whether the corresponding vehicle (vehicle existing in the same lane in front) is a platooning vehicle when there is the vehicle in the same lane in front (S106).

The platooning control apparatus 100 performs avoidance control through lateral control when the corresponding vehicle (vehicle existing in the same lane in front) is not the platooning vehicle (S107), and determines whether there is a vehicle in a same lane in which a frontmost vehicle in a current platooning group is traveling when the corresponding vehicle (vehicle existing in the same lane in front) is the platooning vehicle (S108).

Accordingly, the platooning control apparatus 100 determines the control strategy as Case 3 when there is no vehicle in the same lane in which the frontmost vehicle in the current platooning group is traveling, and determines whether collision avoidance is possible by reducing a distance between platooning vehicles traveling when there is the vehicle in the same lane in which the frontmost vehicle in the current platooning group is traveling (S109).

Next, the platooning control apparatus 100 determines the control strategy as Case 4 when the collision avoidance is possible by reducing the distance between the platooning vehicles traveling, and performs avoidance through lateral control when the collision avoidance is not possible by reducing the distance between the platooning vehicles traveling (S110).

The platooning control apparatus 100 determines a number of lanes in a same driving direction (S111). When the number of the lanes is 1, it is difficult to change lanes, thus it determines the control strategy as Case 6, and when the number of lanes is 2 or more, it determines whether a lane change for collision avoidance is possible (S122).

Accordingly, when the number of lanes is two or more and the lane change for collision avoidance is possible, the platooning control apparatus 100 may determine the control strategy as Case 2 or Case 2-1. On the other hand, when the number of lanes is two or more but the lane change for collision avoidance is not possible due to an obstacle or the like, the platooning control apparatus 100 may determine the control strategy as Case 6.

Hereinafter, as in FIG. 7, when the control strategy is determined as Case 1 to Case X depending on a collision situation and a driving situation, the strategy for each case will be described in detail. In this case, the control strategy for each case is the same as in FIG. 5A to 5H and FIG. 6 described above. In this case, the control strategy for each case may be transferred to each platooning vehicle by the vehicle or the leading vehicle that is a collision party.

Referring to FIG. 8, when determining the control strategy (case (#)), the platooning control apparatus 100 of a platooning vehicle that is predicted to collide determines whether the determined control strategy is Case X (S202), and when it is Case X, there is no problem in driving continuation, and thus requests the platooning vehicles not to perform acceleration or deceleration control in a lateral direction or a longitudinal direction (S203).

Meanwhile, when the control strategy is not Case X, the platooning control apparatus 100 determines whether the control strategy is one of Case 2-1, Case 3, and Case 4 (S204).

Next, when the control strategy is not Case X and is one of Case 2-1, Case 3, and Case 4, the platooning control apparatus 100 requests platooning vehicles to perform platooning control by separating a front group from the following vehicle FVn to the leading vehicle LV which are predicted to collide from a rear group of rear vehicles FV(n+1) to N which follows the following vehicle FVn predicted to collide (S205).

That is, the platooning control apparatus 100 may request the front group of the vehicles FVn to LV to avoid a collision with an abnormal vehicle by changing a lane as illustrated in FIG. 5C for Case 2-1, and may request the front group of the vehicles FVn to LV to avoid collision of the abnormal vehicle with the front group by accelerating to increase a distance from the rear group of the vehicles FV(n+1) to N in FIG. 5D for Case 3. In addition, the platooning control apparatus 100 may request the remaining following vehicles FVn to FV1 and the leading vehicle LV to reduce an inter-vehicle distance by maintaining a longitudinal speed of the leading vehicle LV and allowing the remaining vehicles FVn to FV1 to accelerate among the front group of the vehicles FVn to LV.

Meanwhile, when the control strategy is not Case 2-1, Case 3, or Case 4 in step S204, the platooning control apparatus 100 may determine whether the control strategy is Case 1 or Case 2 (S206).

When the control strategy is Case 1 or Case 2, the platooning control apparatus 100 requests the leading vehicle LV to avoid a collision by allowing the leading vehicle LV to accelerate as illustrated in FIG. 5A or through a lane change as shown in FIG. 5B (S207). In this case, the following vehicles FV1 to FVn may perform a collision determination loop, and a frontmost vehicle among vehicles that do not correspond to Case 1, Case 2, or Case 6 may be selected as a new leading vehicle.

Meanwhile, when the control strategy is not Case 1 or Case 2 in step S206, the platooning control apparatus 100 may perform Case 5 or Case 6 as the control strategy. However, an execution subject of the platooning control apparatus 100 may vary depending on whether a platooning vehicle exists in a same lane in front, i.e., depending on whether the host vehicle is the leading vehicle. Accordingly, the platooning control apparatus 100 determines whether the platooning vehicle exists in the same lane in front (S208). If yes (S210), for Case 5, as illustrated in FIG. 5F, the platooning control apparatus 100 performs deceleration control of the following vehicle FVn, which is a collision party, and the front vehicle FV(n−1) to the leading vehicle LV continue to travel. For Case 6, as illustrated in FIG. 5G, full longitudinal braking of the following vehicle FVn, which is predicted to collide, is performed, and the front vehicle FV(n−1) to the leading vehicle LV are allowed to continue driving.

When no platooning vehicle exists in the same lane in front, the host vehicle becomes the leading vehicle. Accordingly, for Case 5, the leading vehicle LV notifies the rear following vehicle FVn of deceleration and transmits a longitudinal deceleration amount, the following vehicle FVn may decelerate depending on a deceleration amount, and the remaining following vehicles FV1 to N may perform a collision determination loop and may decelerate or change lanes depending on a result thereof. In addition, for Case 6, the leading vehicle LV notifies the rear following vehicle FVn, which is predicted to collide with the abnormal vehicle, of full braking and requests the following vehicles FVn, FV(n+1) . . . to perform platooning separation and to cut off a high voltage and fuel, and the following vehicles FVn, FV(n+1) . . . performs longitudinal deceleration and a collision determination loop and selects the frontmost vehicle FVn among the vehicles that do not correspond to Case 1, Case 2, or Case 6 as a leading vehicle in the rear platooning group (S209). As such, it is possible to prevent human damage due to high voltage cable disconnection and fuel leakage that may occur during a collision by requesting the following vehicle, which is a collision party, to cut off the high voltage and fuel.

On the other hand, for Case 5, when a platooning vehicle exists in a same lane in front, the following vehicle, which is a collision party, notifies the rear following vehicles FVn, FV(n+1) . . . of deceleration and transfers a longitudinal deceleration amount thereto, and then reports a situation to the leading vehicle LV. Further, the following vehicles FVn, FV(n+1) . . . may perform the collision determination loop, and may decelerate or change lanes depending on a result thereof. In addition, when the control strategy is Case 6, the following vehicle FVn, which is a collision party, notifies the following vehicles FVn, FV(n+1) . . . of full braking of the host vehicle, and performs platooning separation and cuts off the high voltage and fuel. The rear following vehicle FVn+1 . . . performs longitudinal deceleration and a collision determination loop. In addition, a frontmost vehicle of the vehicles other than Cases 1, 2, and 6 among the following vehicles FVn, FV(n+1) . . . is selected as a leading vehicle of the rear platooning group.

Referring to FIG. 9, the platooning control apparatus 100 of each of the vehicles to which Case 1 to Case 6 is assigned (S301) determines whether an airbag is deployed (S302). In this case, each platooning vehicle shares whether or not the airbag of the host vehicle is deployed with the leading vehicle LV.

Since a vehicle in which airbag deployment has been performed cannot join the platooning group, the leading vehicle LV reports an accident of the vehicle (S305).

On the other hand, the vehicle in which the airbag deployment is not performed determines whether driving is sustainable by checking whether a driving system is abnormal (S303), and when the vehicle is not in a sustainable driving situation, it is impossible to join the platooning group, so the leading vehicle LV reports an accident of the vehicle (S304). In this case, each platooning vehicle shares whether or not the driving of the host vehicle may be sustainable with the leading vehicle LV.

On the other hand, when the driving of the host vehicle is sustainable, the platooning control apparatus 100 requests the leading vehicle LV to join the platooning group because it is possible to join the platooning group (S306).

As such, according to embodiments of the present invention, when a collision occurs during platooning, not only the leading vehicle but also the following vehicles may predict the collision, and may share collision situation information with the platooning vehicles. In addition, according to embodiments of the present invention, it is possible to prevent human damage due to high voltage cable disconnection and fuel leakage that may occur during a collision.

Figure 10:
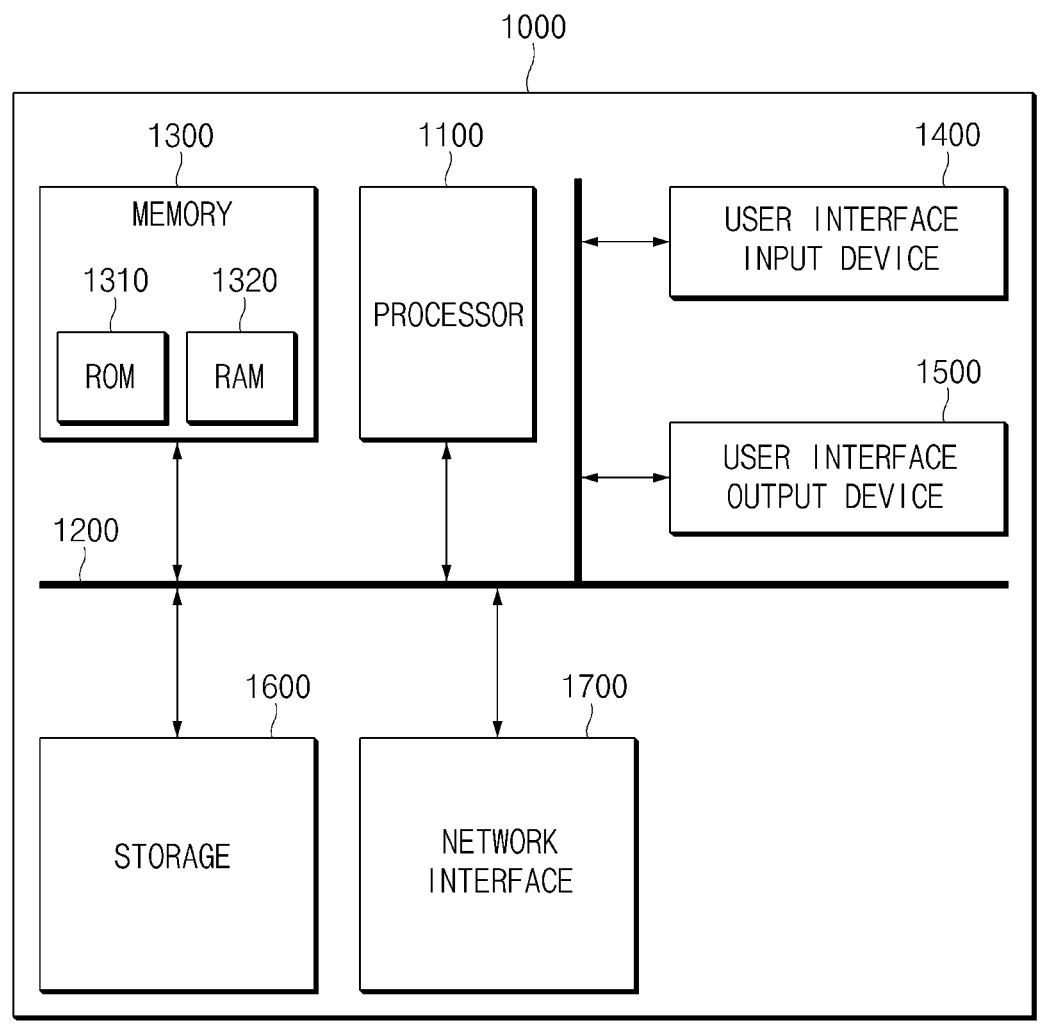
FIG. 10 illustrates a computing system according to an exemplary embodiment of the present invention.

FIG. 10 illustrates a computing system according to an exemplary embodiment of the present invention.

Referring to FIG. 10, the computing system 1000 includes at least one processor 1100 connected through a bus 1200, a memory 1300, a user interface input device 1400, a user interface output device 1500, and a memory (i.e., a storage) 1600, or a network interface 1700.

The processor 1100 may be a central processing unit (CPU) or a semiconductor device that performs processing on commands stored in the memory 1300 and/or the memory 1600. The memory 1300 and the memory 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the memory 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which the present invention pertains may make various modifications and variations without departing from the essential characteristics of the present invention.

Therefore, the exemplary embodiments disclosed in the present invention are not intended to limit the technical ideas of the present invention, but to explain them, and the scope of the technical ideas of the present invention is not limited by these exemplary embodiments. The protection range of the present invention should be interpreted by the claims below, and all technical ideas within the equivalent range should be interpreted as being included in the scope of the present invention.

The invention claimed is:

1. A platooning control apparatus comprising:
a processor; and
a memory storing data and algorithms driven by the processor, wherein the algorithms, when executed by the processor, cause the processor to:
predict potential collisions with a host vehicle or a different vehicle of a plurality of platooning vehicles caused by a vehicle, which is not among the plurality of platooning vehicles, entering a collision prediction area of the host vehicle or the different vehicle during platooning; and
determine a control strategy based on a collision situation to share the control strategy with remaining vehicles of the platooning vehicles,
wherein each of the plurality of platooning vehicles includes the platooning control apparatus, and execution of the algorithms by the processor further causes the processor to:
make a particular prediction, by the platooning control apparatus of a first following vehicle of the plurality of platooning vehicles, of a collision between a leading vehicle of the plurality of platooning vehicles and an abnormal driving vehicle that enters a leading vehicle collision prediction area corresponding to the leading vehicle,
wherein the control strategy, determined in response to the particular prediction, comprises:
the plurality of platooning vehicles being separated into a first platoon comprising the leading vehicle and a second platoon comprising the first following vehicle and a second following vehicle;
the first platoon comprising the leading vehicle performing a lane change to avoid the collision with the abnormal driving vehicle and to avoid a front vehicle driving in front of the leading vehicle; and
the second platoon comprising the first following vehicle and the second following vehicle performing a longitudinal deceleration to avoid the abnormal driving vehicle, and
wherein the control strategy determined in response to the particular prediction is executed by the first platoon comprising the leading vehicle and the second platoon comprising the first following vehicle and the second following vehicle.

2. The platooning control apparatus of claim 1, wherein the algorithms further cause the processor to set an area from a midpoint of an inter-vehicle distance between the host vehicle and a next forward vehicle of the plurality of platooning vehicles to a mid-point of an inter-vehicle distance between the host vehicle and a rear vehicle of the plurality of platooning vehicles as the collision prediction area.

3. The platooning control apparatus of claim 1, wherein the algorithms further cause the processor to:

determine whether the abnormal driving vehicle travels abnormally when the abnormal driving vehicle enters the collision prediction area; and
predict the collision with the abnormal driving vehicle when the abnormal driving vehicle is determined to travel abnormally and is detected in the collision prediction area.

4. The platooning control apparatus of claim 1, wherein the algorithms further cause the processor to determine whether collision avoidance is possible when another vehicle that interferes with driving of the plurality of platooning vehicles exists in the collision prediction area.

5. The platooning control apparatus of claim 4, wherein the algorithms further cause the processor to:
request full longitudinal braking to a rear vehicle of a collision target vehicle when the collision avoidance is impossible; and
control continued driving of the collision target vehicle.

6. The platooning control apparatus of claim 5, wherein the algorithms further cause the processor to:
notify following vehicles of the rear vehicle of the full longitudinal braking of the rear vehicle; and
request the rear vehicle to cut off a high voltage and fuel.

7. The platooning control apparatus of claim 4, wherein the algorithms further cause the processor to determine whether avoidance through deceleration is possible in response to a determination that the collision avoidance is possible.

8. The platooning control apparatus of claim 7, wherein the algorithms further cause the processor to:
request longitudinal deceleration to a rear vehicle of a collision target vehicle in response to a determination that the avoidance through deceleration is possible; and
control continued driving of the collision target vehicle.

9. The platooning control apparatus of claim 7, wherein the algorithms further cause the processor to determine whether the front vehicle exists in front of the leading vehicle of the plurality of platooning vehicles in a lane in which the plurality of platooning vehicles is currently traveling in response to a determination that the avoidance through deceleration is impossible.

10. The platooning control apparatus of claim 9, wherein the algorithms further cause the processor to request collision avoidance through front acceleration driving to the leading vehicle among the plurality of platooning vehicles when the front vehicle does not exist in front of the leading vehicle in response to prediction of the collision of the leading vehicle.

11. The platooning control apparatus of claim 9, wherein the algorithms further cause the processor to request collision avoidance through the lane change to the leading vehicle among the plurality of platooning vehicles in response to a determination that the front vehicle exists in front of the leading vehicle in response to the prediction of the collision of the leading vehicle.

12. The platooning control apparatus of claim 9, wherein, in response to a determination that a particular vehicle in front of a collision target vehicle is one of the plurality of platooning vehicles and a different prediction that a different collision will occur behind the collision target vehicle, the algorithms further cause the processor to classify the collision target vehicle and platooning vehicles of the plurality of platooning vehicles in front of the collision target vehicle as a front group.

13. The platooning control apparatus of claim 12, wherein the algorithms further cause the processor to:

request the platooning vehicles of the front group to avoid the collision by changing a lane of the front group when there is the another vehicle in front of the front group; or request the platooning vehicles of the front group to avoid the collision by allowing the front group to accelerate when there is no other vehicle in front of the front group.

14. The platooning control apparatus of claim 12, wherein the algorithms further cause the processor to request the platooning vehicles of the front group to avoid the collision by reducing a distance between the leading vehicle and following vehicles except for the leading vehicle in the front group when there is the another vehicle in front of the front group.

15. The platooning control apparatus of claim 12, wherein the algorithms further cause the processor to:

classify following vehicles of the plurality of platooning vehicles located behind the front group as a rear group; and set a frontmost vehicle of the rear group as a new leading vehicle.

16. The platooning control apparatus of claim 1, wherein the algorithms further cause the processor to:

perform longitudinal deceleration of the host vehicle;

notify rear vehicles of the longitudinal deceleration of the host vehicle;

transmit a deceleration amount of the host vehicle to the rear vehicles; and report a driving situation to the leading vehicle.

17. The platooning control apparatus of claim 1, wherein the algorithms further cause the processor to:

perform longitudinal deceleration of the host vehicle;

notify rear vehicles of the longitudinal deceleration of the host vehicle; and transmit a deceleration amount of the host vehicle to the rear vehicles.

18. A platooning control method comprising:

making a prediction, by a platooning control apparatus of a first following vehicle of a plurality of platooning vehicles, of a collision between a leading vehicle of the plurality of platooning vehicles and an abnormal driving vehicle that enters a leading vehicle collision prediction area corresponding to the leading vehicle; and;

determining, by the platooning control apparatus, a control strategy based on the prediction, wherein the control strategy comprises:

the plurality of platooning vehicles being separated into a first platoon comprising the leading vehicle and a second platoon comprising the first following vehicle and a second following vehicle;

the first platoon comprising the leading vehicle performing a lane change to avoid the collision with the abnormal driving vehicle and to avoid a front vehicle driving in front of the leading vehicle; and the second platoon comprising the first following vehicle and the second following vehicle performing a longitudinal deceleration to avoid the abnormal driving vehicle, and wherein the control strategy determined in response to the prediction is executed by the first platoon comprising the leading vehicle and the second platoon comprising the first following vehicle and the second following vehicle.

* * * * *